United States Patent [19]
Lynch

[11] 3,916,289
[45] Oct. 28, 1975

[54] DC TO DC CONVERTER
[75] Inventor: Thomas H. Lynch, Canoga Park, Calif.
[73] Assignee: The United States of America as represented by the Secretary of the Air Force, Washington, D.C.
[22] Filed: Jan. 16, 1975
[21] Appl. No.: 541,537

[52] U.S. Cl. ........................... 321/45 R; 331/113 A
[51] Int. Cl.² .......................................... H02M 7/52
[58] Field of Search .......... 321/45 R, 18; 331/113 A

[56] References Cited
UNITED STATES PATENTS

| | | |
|---|---|---|
| 3,111,632 | 11/1963 | Murphy ........................ 331/113 A |
| 3,210,690 | 10/1965 | Mokrytzkl et al. ............. 331/113 A |
| 3,243,725 | 3/1966 | Raposa et al. .................. 331/113 A |
| 3,253,235 | 5/1966 | Harbaugh ....................... 331/113 A |
| 3,403,319 | 9/1968 | Tate ............................ 331/113 A X |
| 3,473,104 | 10/1969 | Tate ................................ 321/45 R |
| 3,487,335 | 12/1969 | Lingle ............................ 331/113 A |
| 3,579,026 | 5/1971 | Paget ......................... 331/113 A X |
| 3,629,725 | 12/1971 | Chun ............................. 331/113 A |

*Primary Examiner*—William M. Shoop
*Attorney, Agent, or Firm*—Joseph E. Rusz; George Fine

[57] ABSTRACT

A device to convert an input DC voltage to another DC voltage at high efficiency includes transformers in combination with transistors whose operation forms a self-sustaining converter oscillator.

2 Claims, 1 Drawing Figure

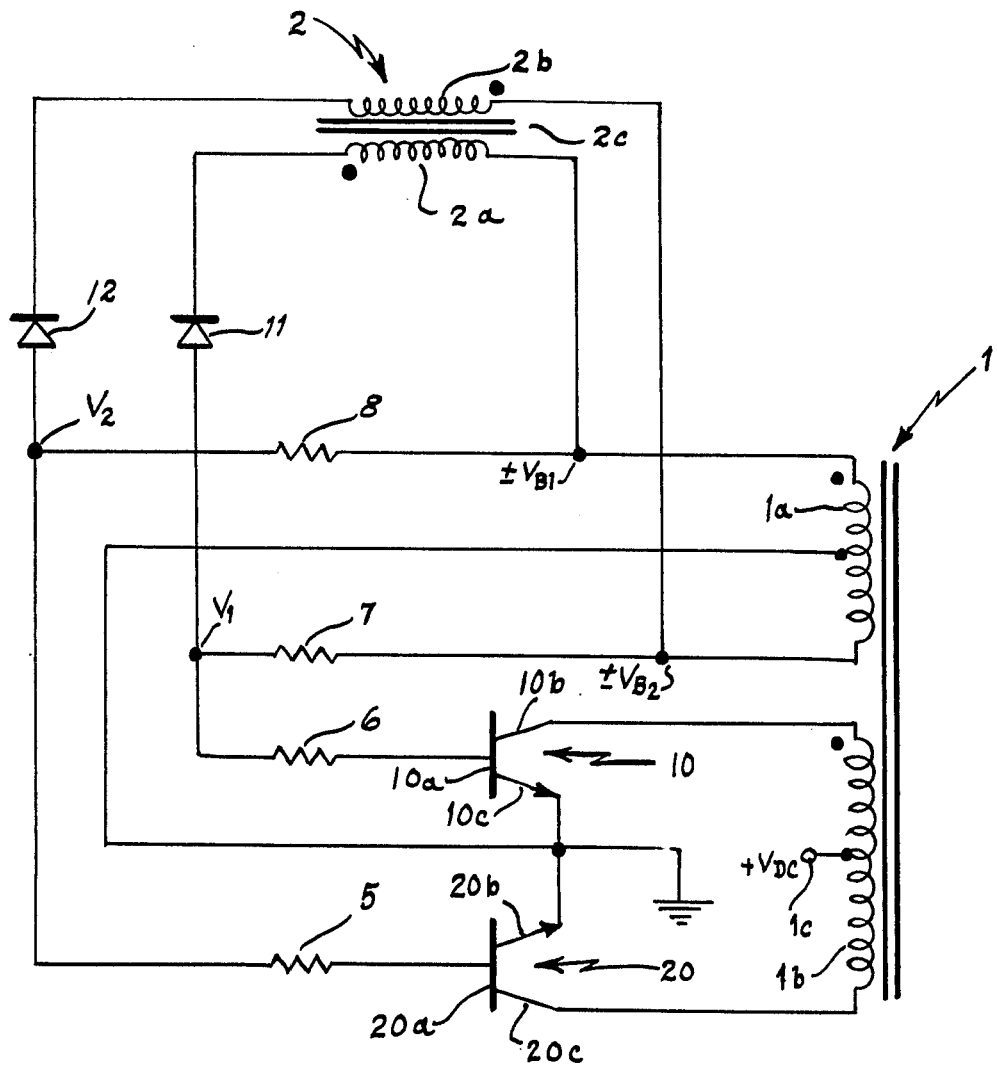

3,916,289

DC TO DC CONVERTER

STATEMENT OF GOVERNMENT INTEREST

The invention described herein may be manufactured and used by or for the Government for governmental purposes without the payment of any royalty thereon.

BACKGROUND OF THE INVENTION

The device of this invention converts an input DC voltage to another DC voltage at high efficiency. As with other prior art devices saturating magnetic components are used for simplicity and efficiency. Virtually all prior art free running DC to DC converters using transformer(s) or transformer(s) and other magnetic saturable reactors suffer from a common problem which is dual conduction of the transistor switch pair during the turn off delay time resulting from the stored base charge.

This dual conduction problem increases the converter rfi and reduces efficiency. This problem imposes a limitation in the frequency that could be used — from an efficiency standpoint converter time period $>>t_s$.

This invention utilizes a new configuration of magnetic components that solves the dual conduction problem. The simplicity is not sacrificed. Efficiency is increased and substantial reduction of rfi results by eliminating dual conduction of the converter transistors during turn off storage time.

SUMMARY OF THE INVENTION

A DC to DC converter is provided which includes a saturable reactor and a nonsaturating output transformer. A transistor switch pair is associated with the output transformer. The saturable reactor is the principle timing element. The saturable reactor provides turn off commands for the on transistor. The output transformer $di/dt$ (when the transistor that is on finally turns off) turns the opposite transistor on and the cycle repeats on the other half. The saturable reactor is wound bifilar. The frequency is determined by the saturable reactor.

DESCRIPTION OF THE DRAWINGS

A single FIGURE shows in diagrammatic form the DC to DC converter including a saturable reactor and a transistor switch pair associated with an output transformer.

DETAILED DESCRIPTION OF THE PREFERRED EMBODIMENT

Now referring in detail to the single FIGURE, there is shown saturable reactor 2 (transformer) having bifilar windings 2a and 2b on square loop core 2c. Winding 2a is equal in number to winding 2b. Saturable reactor 2 is the principle timing element and its connection is one of the features of this invention.

Output nonsaturable transformer 1 includes center tap windings 1a and 1b. Center tap winding 1b includes terminal 1c positioned at the center thereof. A transistor switch pair is comprised of transistors 10 and 20. Transistor 10 consists of base 10a, collector 10b, and emitter 10c. Transistor 20 consists of base 20a, collector 20b, and transmitter 20c. Resistors 5, 6, 7 and 8 are identical and equal in magnitude.

It is noted that in the following operation transformer 2 is referred to as T2. Diodes 11 and 12 are referred to as D1 and D2, respectively. Resistors 5, 6, 7 and 8 are all of equal magnitude and R is utilized in the equations to represent the magnitude of the appropriate resistor.

In operation consider that transistor 10 has just turned on. $V_1$ is a positive voltage equal to $V_{B1}-(I_{B1}+I_{D1})R=V_{BE1}+I_{B1}R$.

The reactor winding thus has an applied potential of $V_{T2(N1)}=V_1-V_{FD1}-(-V_{B2})$. Before transformer 2 saturates it conducts a current $$I_m = \frac{Hlm}{0.4\pi N}(=I_{D1}).$$

$Im$ is made smaller than $I_B$ so that the normal base drive is not disturbed. When transformer 2 saturates a large current flows approaching $$I_{D1} \leq \frac{2V_B-V_{FD1}}{R}.$$

The voltage $V_1$ thus approaches $V_1 \geq -V_B-V_{FD1}$. The base drive of transistor 10 is reversed and starts to turn off.

When the base stored charge diminishes to zero, the current of collector 10a rapidly drops. An opposing voltage is induced in the collector winding by $$E = L_p \frac{dic}{dt}.$$

The drive for $V_{B1}$ reverses holding transistor 10 off; simultaneously transistor 20 turns on. Diode 11 shuts off because $V_B>V_1$. Diode 12 turns on ($V_2>-V_B$) coupling reactor winding 2b for its timing cycle. Winding 2b is phased opposite winding 2a to accomplish driving saturable reactor 2 (transformer) from $B_m$ to $-B_m$ on alternate cycles. The operation thus forms a self-sustaining converter operator.

It is noted that the device of the present invention prevents simultaneous conduction due to transistor storage. Saturable reactor 2 provides turn off commands for the on transistor. Nonsaturating output transformer 1 $di/dt$ (when the transistor that is on finally turns off) turns the opposite transistor on the cycle repeats on the other half. The saturable reactor is wound bifilar.

What is claimed is:

1. A DC to DC converter being comprised of a nonsaturating output transformer having a first and second center tap windings, each having first and second ends, said second center tap winding including a terminal in the center tap position thereof for a DC voltage, the center tap of said first winding being connected to ground, first and second transistors, each having a base, collector, and emitter, said transistors operating as a switch pair, each of said emitters being connected to ground, said collectors of said first and second transistors being connected to said first and second ends, respectively, of said second center tap winding, of said nonsaturating output transformer, first, second, third and fourth resistors, first and second diodes, a saturating reactor having first and second windings oppositely phased, said saturating reactor operating as a timing element, a first series arrangement in the recited sequence consisting of said first winding of said saturable reactor, said first diode and said first resistor, said first series arrangement interconnecting said base of said first transistor and said first end of said first center tap winding of said nonsaturating output transformer, and a second series arrangement in the recited sequence consisting of said second winding of said saturable reactor, said second diode, and said second resistor, said second series arrangement interconnecting said second end of said first winding of said nonsaturable output transformer and said base of said second transistor, said first and second ends of said first winding of said non-saturating output transformer being connected to said first and second diodes by way of said third and fourth resistors, respectively.

2. A DC to DC converter as described in claim 1 further including a square loop core for said saturable reactor.

* * * * *